United States Patent Office 3,131,105
Patented Apr. 28, 1964

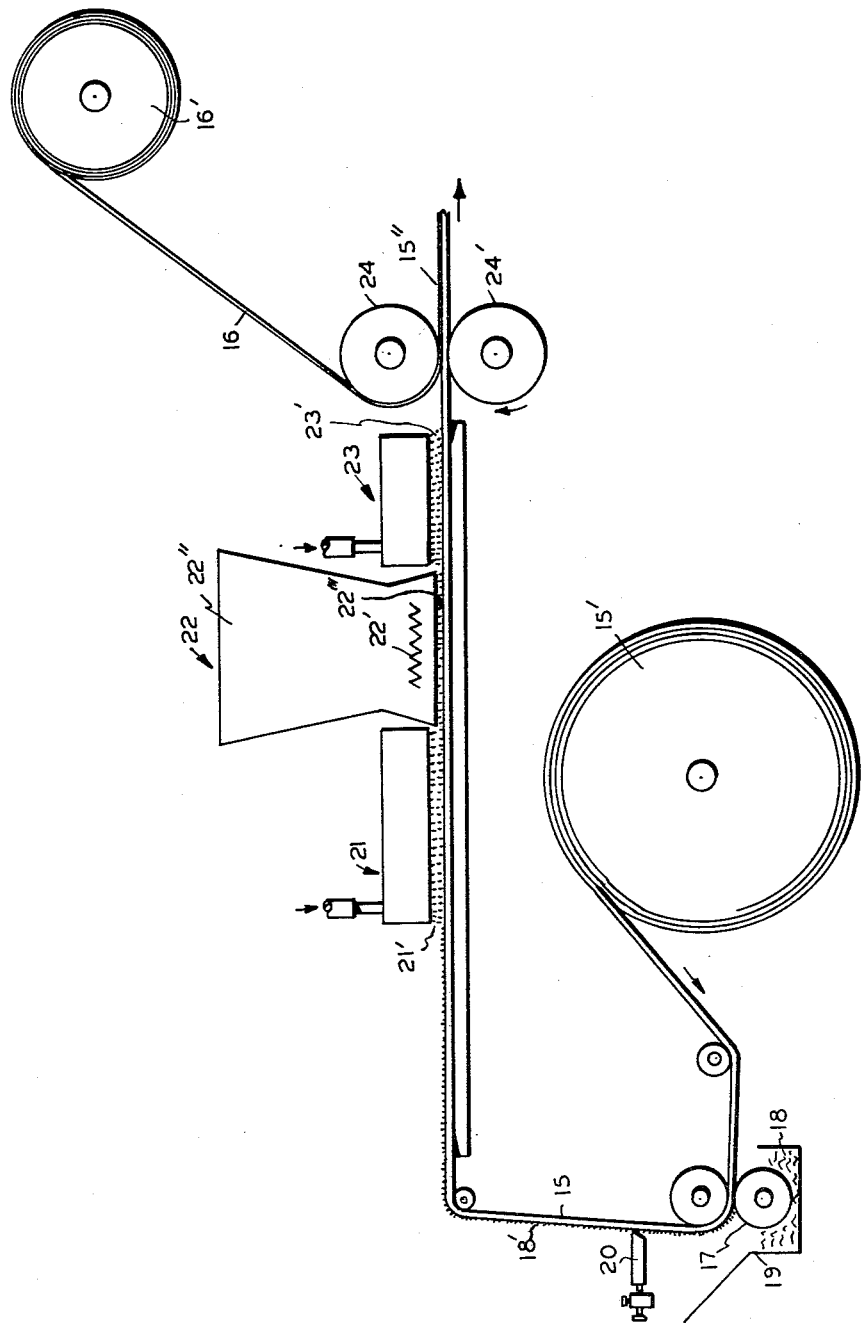

3,131,105
METHOD OF BONDING POLYURETHANE FOAM TO BASE MATERIALS BY FLAME TREATMENT
William V. Codos, Clifton, N.J., assignor to Pathe Equipment Company, Inc., East Paterson, N.J., a corporation of New York
Filed Oct. 13, 1961, Ser. No. 144,938
7 Claims. (Cl. 156—82)

The present invention relates to methods for forming a laminated structure in which a layer of polyurethane foam of a polyester or a polyether type is bonded to plastic, fabric or any other material by heating a surface of the polyurethane to render it soft and tacky so it may be applied onto such other material and form a bond therewith and thus avoid the use of any adhesive additive.

Heretofore, methods in this class of thermosetting required that a flame be directly impinged upon one surface of the polyurethane in order to plasticize such surface. This was done by a series of flame jets from individual nozzles connected to a common gas supply line. However, practice has shown that such method of supplying heat is unsatisfactory because of the non-uniformity of the heat received by the surface being treated, meaning that all parts of the surface are not evenly heated. This occurred because the surface was exposed only to the heat generated by the points of the flames; and, even if the individual flames flattened against the surface to overlap each other with different parts of a flame having different temperatures, there occurred sharp differences in surface heat over the entire area, thereby resulting in an improper plasticization of the surface of the polyurethane. Too much heat at some spots would damage the polyurethane and insufficient heat at others would of course effect incomplete plasticization and hence a damaged and non-uniformly bonded laminated structure would be the result. There was no way to adjust and control the heating to get a proper uniform bond and further, any changes in pressure, surges or other disturbances in the gas supply line, only added to the non-uniformity of the results obtained.

It is therefore an object of the present invention to provide novel and improved methods of the type mentioned, whereby the heat of flame afforded the polyurethane surface, is uniform throughout.

Another object thereof is to provide novel and improved methods of the character set forth, affording control and adjustment of the heat effected, thereby insuring that the entire surface to be heated will receive the proper specified heat.

A further object of this invention is to provide novel and improved methods for the purpose stated, having the mentioned attributes and which are simple to practice, reasonable in cost to perform and efficient in carrying out the functions for which they are designed.

Other objects and advantages will become apparent as this disclosure proceeds.

For one practice of this invention, a surface of the polyurethane layer is given a coating of uniform thickness of an inflammable material having a high flash point. This coating is then ignited, which will cause plasticization of said surface. Then while such surface is still tacky, the other member to be bonded thereto, is applied onto said surface with pressure.

For the bonding of long webs, the polyurethane layer is run through a machine where it first receives the inflammable coating of predetermined thickness, then passes to expose the coating to an ignitor which is mounted between two zones, each zone offering said coating a combustion-preventing area. After leaving the last of said zones, the web of the other material is applied onto the tacky surface now presented by the polyurethane and the composite formed is passed through nip rollers.

I will now set forth this invention in detail and for the illustration of my method used in a continuous operation, I submit the accompanying drawing which shows in diagrammatic manner, a machine suitable for the practice of my teachings.

It is evident that the essential incidents of my method are first to give a surface of the polyurethane ply a coating of an inflammable material which when ignited will cause the plasticization of polyurethane, then to ignite said coating whereupon said surface is plasticized and finally to apply a second ply of any other material to the softened and tacky surface to form a laminated structure.

The inflammable coating may be a volatile jellied agent consisting of a suitable petroleum product, such as gasoline, kerosene, benzene, naphtha and the like, or any alcohol, such as methanol, grain, denatured and the like, or an acetone product or any fluid which has a high flash point which is "jellied" by being mixed with a carrier, as for instance, an aluminum oxide soap, a sodium stearate or other equivalent type of jellying agent in paste form, or such inflammable coating may be made of inflammable solid granules as for instance magnesium or sulphur in a suitable jelly or paste carrier.

Of importance is that such coating material can be applied as a uniform-thickness layer onto the polyurethane surface and by any well known means such layer's thickness can be controlled and adjusted. Because of the uniformity of the fuel, there will be uniformity of the heat offered over the entire treated surface when said coating is ignited.

For efficient, economical and continuous manufacture of laminated structures by the method taught herein, I suggest a set-up of apparatus as shown in the drawing, for bonding a web of polyurethane foam 15, of say from about 1/8" upward in thickness and of any desired width, with for instance a fabric ply or other web 16 of any material; said webs 15 and 16 being fed from off the revolvably mounted rolls 15', 16' respectively. I provide that soon after leaving its roll 15', the polyurethane web being drawn through the machine, shall be coated by the roller 17 with an inflammable substance 18 from the tank 19. Said inflammable substance when ignited will cause the plasticization of polyurethane. The thickness of the coating 18' shall be then determined by the adjustable doctor blade 20 and thence the coated web 15 shall first pass the station 21 where an inert gas 21' as nitrogen, is played upon it before it shall come to the station 22 where an electrically-heated coil 22' positioned in a flue 22", shall ignite the coating which is on the web portion between the identically-acting inert gas stations 21 and 23. The action of the inert gas 21' at station 21 is to keep the flame 22''' from going to the tank 19 and the action of the gas 23' at station 23 is to extinguish the flame on the web portion coming under it, that is, the arrangement functions to confine the flame 22''' to the ignited coating portion which is between the stations 21, 23 which do not support combustion. Said flame is of uniform intensity which will generate uniform heat on said coated web portion and plasticize its surface uniformly. After passing the station 23, the plasticized surface portion while yet soft and tacky and dropped to a temperature which is unharmful to the web 16, shall have applied thereto the web 16 which is imposed thereon under pressure as is afforded by the power-driven nip rollers 24, 24', which also serve to run the webs 15, 16 from off their rolls in this apparatus for making the laminate 15".

The term "combustion-prevention area" shall be deemed to include any means which prevents combustion from taking place or which compels combustion to discontinue. In the specific embodiment herein described, I have utilized the inert gas stations 21 and 23. Another way for instance would be to substitute nip rollers to engage the polyurethane web at the position of said stations, which is readily understandable without further illustration. The broad meaning of such term shall also apply to its use in the appended claims.

This invention is capable of many forms of practice without departing from the essential features herein disclosed. It is therefore intended and desired that the practices set forth herein shall be deemed illustrative and not restrictive and that the patent shall cover all patentable novelty herein set forth; reference being had to the following claims rather than to the specific description herein, to indicate the scope of this invention.

I claim:

1. The method of forming a laminated structure, which comprises applying onto the surface of a layer of polyurethane foam, a coating of substantially uniform thickness of an inflammable substance which when ignited will plasticize said surface, igniting said coating to plasticize said surface and then applying with pressure a layer of material with which said plasticized surface will form a bond, onto said plasticized surface while said surface is soft and tacky.

2. The method of forming a laminated structure, which comprises of continuously moving a layer of polyurethane foam in one direction through two spaced inert gaseous means, each offering a combustion-preventing area, applying onto a surface of said moving layer before it reaches the first of said areas, a coating of an inflammable substance which when ignited will plasticize said surface, igniting the coating which is between said areas and then applying with pressure a layer of material with which said plasticized surface will form a bond, onto said plasticized surface while said foam layer is moving and said surface is soft and tacky.

3. A method as defined in claim 2, including the step of making the thickness of the coating to be substantially uniform before it leaves the first of said areas.

4. A method as defined in claim 1, wherein the coating comprises said inflammable substance in paste form.

5. A method as defined in claim 4, wherein said inflammable substance is volatile.

6. A method as defined in claim 2, wherein the coating comprises said inflammable substance in paste form.

7. A method as defined in claim 6, wherein said inflammable substance is volatile.

References Cited in the file of this patent

UNITED STATES PATENTS

| | | |
|---|---|---|
| 2,799,610 | Magill | July 16, 1957 |
| 2,957,793 | Dickey | Oct. 25, 1960 |
| 2,983,639 | Jageman | May 9, 1961 |
| 3,057,766 | Dickey | Oct. 9, 1962 |